US012409464B1

(12) United States Patent
Hong

(10) Patent No.: US 12,409,464 B1
(45) Date of Patent: Sep. 9, 2025

(54) POWDER SPRAYER

(71) Applicant: HEFEI YAOZHONG INTERNATIONAL TRADE CO., LTD., Anhui (CN)

(72) Inventor: Jinhui Hong, Anhui (CN)

(73) Assignee: HEFEI YAOZHONG INTERNATIONAL TRADE CO., LTD., Hefei (CN)

( * ) Notice: Subject to any disclaimer, the term of this patent is extended or adjusted under 35 U.S.C. 154(b) by 0 days.

(21) Appl. No.: 19/031,657

(22) Filed: Jan. 18, 2025

(51) Int. Cl.
*B05B 7/14* (2006.01)
*B05B 15/656* (2018.01)

(52) U.S. Cl.
CPC .......... *B05B 7/1486* (2013.01); *B05B 7/1463* (2013.01); *B05B 15/656* (2018.02)

(58) Field of Classification Search
CPC .... B05B 7/1486; B05B 15/656; B05B 7/1463
See application file for complete search history.

(56) References Cited

U.S. PATENT DOCUMENTS 600,547 A * 3/1898 Mazzanovich ....... B05B 11/062 222/633
1,825,608 A * 9/1931 Shaukis .................. B05B 11/06 239/362
3,105,619 A * 10/1963 Rohrmuller .......... B67D 1/0425 222/481
7,140,522 B2 * 11/2006 Kress ..................... A45D 33/02 132/319

FOREIGN PATENT DOCUMENTS

KR 950007828 Y1 * 9/1995 ........... B05B 15/656

OTHER PUBLICATIONS

KR 950007828 Translation (Year: 1995).*

* cited by examiner

*Primary Examiner* — Steven M Cernoch
(74) *Attorney, Agent, or Firm* — HOWARD M COHN and Associates, LLC

(57) ABSTRACT

A powder sprayer includes a powder storage tank, a nozzle communicated with the powder storage tank, a telescopic rod, and a balloon. The telescopic rod is communicated with the powder storage tank and is spaced apart from the nozzle. A length of the telescopic rod is adjustable. The balloon is communicated with one end of the telescopic rod away from the powder storage tank. By such configurations, an application range of the powder sprayer is increased and safety of the powder sprayer is improved.

15 Claims, 3 Drawing Sheets

POWDER SPRAYER

TECHNICAL FIELD

The present disclosure relates to a field of powder spraying tools, and in particular to a powder sprayer.

BACKGROUND

In the prior art, powder sprayers are widely used in various occasions, such as agricultural pesticide application, industrial spraying, etc. In the prior art, the powder sprayers generally comprise a balloon, a powder storage tank, and a nozzle. Powder is sprayed from the nozzle, and a distance between the nozzle and an operator is relatively close, which makes it easy for the operator to come into close contact with sprayed powder during use. The sprayed powder is easily inhaled by the operator, posing a potential threat to health of the operator.

SUMMARY

The embodiment of the present disclosure provides a powder sprayer, which increases a distance between a nozzle thereof and an operator, reduces a risk of powder being inhaled by the operator, and increases safety.

In a first aspect, the present disclosure provides a powder sprayer. The powder sprayer comprises a powder storage tank, a nozzle communicated with the powder storage tank, a telescopic rod, and a balloon.

The telescopic rod is communicated with the powder storage tank and is spaced apart from the nozzle. A length of the telescopic rod is adjustable. The balloon is communicated with one end of the telescopic rod away from the powder storage tank.

Optionally, the telescopic rod comprises rod portions. The rod portions are sequentially connected between the balloon and the powder storage tank. The rod portions are communicated with each other. Two adjacent rod portions are sleeved with each other and are slidable relative to each other.

Optionally, the two adjacent rod portions are hermetically connected.

Optionally, the rod portions comprise a first rod portion and a second rod portion disposed adjacent to the first rod portion. The first rod portion is sleeved on an outer side of the second rod portion. The second rod portion is slidable relative to the first rod portion. A thread is disposed on an outer periphery of an end portion of the first rod portion close to the second rod portion.

The telescopic rod further comprises a screw joint. The screw joint is sleeved on the second rod portion and is screwed with the thread of the first rod portion. The screw joint is configured to fix the second rod portion relative to the first rod portion.

Optionally, the telescopic rod further comprises a sealing ring. The sealing ring is sleeved on the second rod portion and disposed between the first rod portion and the second rod portion.

Optionally, a length of at least one of the rod portions is greater than a length of the nozzle.

Optionally, the powder sprayer further comprises a handle. The handle is connected to the one end of the telescopic rod away from the powder storage tank, and the balloon is mounted on the handle.

Optionally, the handle comprises a first end portion and a second end portion disposed opposite to the first portion.

The balloon is mounted between the first end portion and the second end portion of the handle. The first end portion of the handle is connected to the telescopic rod.

Optionally, the first end portion of the handle defines an air channel, and the balloon is communicated with the telescopic rod through the air channel.

Optionally, the powder sprayer further comprises a check valve, and the check valve is disposed in the air channel.

Optionally, the handle further comprises a first connecting portion. The first connecting portion connects the first end portion of the handle to the second end portion of the handle. One side of the first connecting portion facing the balloon is arc-shaped and is matched with the balloon.

Optionally, the handle further comprises a second connecting portion disposed opposite to the first connecting portion. The second connecting portion is connected between the first end portion of the handle and the second end portion of the handle. The second connecting portion is spaced apart from the balloon.

Optionally, the powder storage tank comprises a tank body and a cover body. The cover body covers the tank body. The cover body comprises an air inlet and an air outlet. The air inlet is communicated with the telescopic rod. The air outlet is communicated with the nozzle.

Optionally, the powder storage tank further comprises an air inlet pipe and an air outlet pipe. The air inlet pipe is communicated with the air inlet. The air outlet pipe is communicated with the air outlet.

The telescopic rod, the powder storage tank, and the nozzle are disposed in sequence. The air inlet pipe is bent in a direction away from the tank body and towards the telescopic rod. The air outlet pipe is bent in the direction away from the tank body and towards the nozzle.

Optionally, the air inlet pipe protrudes from one side of the cover body toward the tank body.

Optionally, the telescopic rod is screwed with the air inlet pipe, and the nozzle is screwed with the air outlet pipe.

Optionally, the air inlet pipe, the air outlet pipe, and the cover body are integrally formed.

Optionally, the powder sprayer further comprises a check valve, the check valve is disposed between the balloon and the telescopic rod.

Optionally, the powder sprayer further comprises a check valve, the check valve is disposed between the telescopic rod and the powder storage tank.

In the powder sprayer of the embodiment of the present disclosure, the telescopic rod with adjustable length is connected between the balloon and the powder storage tank, so as to increase the distance between the nozzle and the operator by adjusting the length of the telescopic rod, thereby reducing the risk of powder being inhaled and ensuring the safety and health of the operator. Moreover, since there is no need to increase the length of the nozzle, a problem of powder clogging in the nozzle is reduced. In addition, since the length of the telescopic rod is adjustable, the operator only needs to simply adjust the length of the telescopic rod without frequently changing an operating position or changing tools, so as to adapt to different operating conditions. Therefore, an application range of the powder sprayer is expanded, a convenience of operation and work efficiency is improved, and adaptability and practicality of the powder sprayer are enhanced. When the powder sprayer is not in use, the telescopic rod is allowed to be retracted to a shortest length, making the powder sprayer compact and easy to store and carry.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

For a complete understanding of the present disclosure and its characteristics, the following description will be made in conjunction with the accompanying drawings, where same reference numbers in the following description indicate same structures.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. The following description of at least one exemplary embodiment is merely illustrative and is in no way intended as any limitation on the present disclosure, applications thereof, and use thereof. Based on the embodiments of the present disclosure, all other embodiments obtained by those of ordinary skill in the art without creative work shall fall within the protection scope of the present disclosure.

Reference herein to "embodiment" or "implement" means that a particular feature, structure, or characteristic described in connection with one embodiment or one implement may be comprised in at least one embodiment of the present disclosure. The appearances of the "embodiment" in various positions in the specification are not necessarily referring to the same embodiment, and are not independent or alternative embodiments mutually exclusive of other embodiments. Those skilled in the art explicitly and implicitly understand that the embodiments described herein may be combined with other embodiments.

Figure 1:
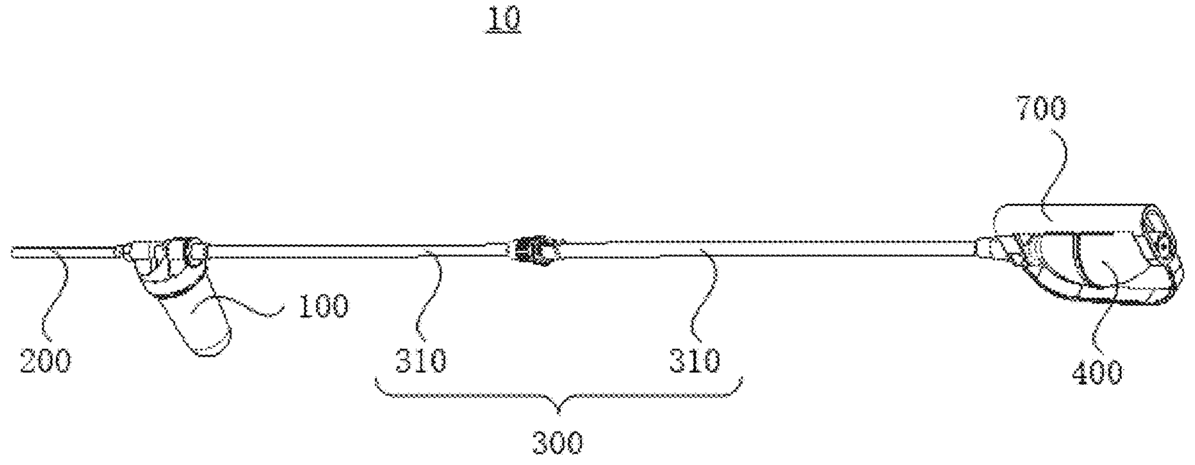
FIG. 1 is a schematic diagram of a powder sprayer according to one embodiment of the present disclosure.

The present disclosure provides a powder sprayer. As shown in FIG. 1, FIG. 1 is a schematic diagram of the powder sprayer according to one embodiment of the present disclosure. The powder sprayer comprises a powder storage tank 100, a nozzle 200, a telescopic rod 300, and a balloon 400. The nozzle 200 is communicated with the powder storage tank 100. The telescopic rod 300 is communicated with the powder storage tank 100 and is spaced apart from the nozzle 200. A length of the telescopic rod 300 is adjustable. The balloon 400 is communicated with one end of the telescopic rod 300 away from the powder storage tank 100.

The powder storage tank 100 is configured to store powder. The powder may be of various types, which is selected according to specific usage requirements. The nozzle 200 is connected to the powder storage tank 100. The nozzle 200 is an outlet for spraying powder. Through the nozzle 200, the powder is sprayed and covered to ae target spraying area. The telescopic rod 300 is connected to the powder storage tank 100, and the one end of the telescopic rod 300 away from the powder storage tank 100 is communicated with the balloon 400, so the telescopic rod 300 serves as a transmission device connecting the balloon 400 and the powder storage tank 100. When the balloon 400 is squeezed, air is squeezed into the telescopic rod 300, thereby pushing the powder in the powder storage tank 100 to be sprayed out through the nozzle 200.

In the embodiment of the present disclosure, the powder sprayer 10 comprises the telescopic rod 300 connected between the balloon 400 and the powder storage tank 100, which obviously increases a distance between the nozzle 200 and an operator. Furthermore, a length of the telescopic rod 300 is adjustable, and the operator is able to adjust an overall length of the powder sprayer 10 by adjusting the length of the telescopic rod 300 according to actual needs. When the telescopic rod 300 is extended longer, the distance between the nozzle 200 and a face of the operator is longer, thereby physically reducing a possibility of the operator inhaling powder, increasing an application range of the powder sprayer and improving operational safety.

It is understood that if there is no telescopic rod 300, in order to increase the distance between the operator and the nozzle 200, a length of the nozzle 200 needs to be increased, and an increase in the length of the nozzle 2001 makes a powder conveying path thereof being too long, which increases the risk of powder deposition and clogging. As a compromise, the overall length of the powder sprayer 10 is limited. In the embodiment of the present disclosure, the configuration of the telescopic rod 300 avoids a problem of the nozzle 200 being too long, there is no need to increase the length of the nozzle 200, and the powder conveying path is no needed to be increased, which reduces the problem of powder clogging.

Moreover, in the embodiment of the present disclosure, the length of the telescopic rod 300 is adjustable, so that the powder sprayer 10 is able to adapt to a variety of usage scenarios and distance requirements. For example, in usage scenarios such as agricultural spraying and industrial spraying, the operator is able to adjust the length of the telescopic rod 300 according to a height and a distance of the target spraying area to accurately control a spraying direction and a distance of the powder, which optimizes a powder spraying effect and ensures that the powder evenly and completely covers the target spraying area.

In the powder sprayer of the embodiment of the present disclosure, the telescopic rod 300 with adjustable length is connected between the balloon 400 and the powder storage tank 100, so as to increase the distance between the nozzle 200 and the operator by adjusting the length of the telescopic rod 300, thereby reducing the risk of powder being inhaled and ensuring the safety and health of the operator. Moreover, since there is no need to increase the length of the nozzle 200, the risk of powder clogging in the nozzle 200 is reduced. In addition, since the length of the telescopic rod 300 is adjustable, the operator only needs to simply adjust the length of the telescopic rod 300 without frequently changing an operating position or changing tools, so as to adapt to different operating conditions. Therefore, the application range of the powder sprayer is expanded, a convenience of operation and work efficiency is improved, and adaptability and practicality of the powder sprayer are enhanced. When the powder sprayer is not in use, the telescopic rod 300 is allowed to be retracted to a shortest length, making the powder sprayer compact and easy to store and carry.

In some embodiments, the telescopic rod 300 comprises rod portions 310. The rod portions 310 are sequentially connected between the balloon 400 and the powder storage tank 100. The rod portions 310 are communicated with each other. Two adjacent rod portions 310 are sleeved with each other and are slidable relative to each other.

In the embodiment, the rod portions 310 are sequentially connected between the balloon 400 and the powder storage tank 100, so as to from a continuous and unobstructed air transmission channel, ensuring that the air is transferred from the balloon 400 to the powder storage tank 100 through the telescopic rod 300. The two adjacent rod portions 310 are sleeved with each other and are slidable relative to each other, so that the length of the telescopic rod 300 is flexibly adjusted as needed to adapt to different usage scenarios and different spraying distances. In a specific use process, the operator only needs to adjust the length of the telescopic rod 300 by simply sliding any one of the rod portions 310 according to work requirements, without relying on complex mechanical devices or tools, which enhances the convenience of operation.

In some embodiments, the two adjacent rod portions 310 are hermetically connected. The two adjacent rod portions 310 are hermetically connected. A sealed connection between the two adjacent rod portions 310 ensures that the air does not leak from a joint of the telescopic rod 300 during a compression process or a releasement process of the balloon 400, thereby ensuring the spraying efficiency of the powder sprayer 10. During a powder spraying process, the sealed connection between the two adjacent rod portions 310 further prevents the powder from leaking out from the joint of the telescopic rod 300, keeps a working environment clean, reduces a waste of powder, and protects the health of the operator. The sealed connection between the two adjacent rod portions 310 further reduces an erosion of dust and moisture on an interior of the telescopic rod 300, thereby extending service life of the powder sprayer 10. In addition, the sealed connection between the two adjacent rod portions 310 further makes the telescopic rod 300 well adapt to a variety of working environments. Whether in a dry, humid or dusty environment, the sealed connection between the two adjacent rod portions 310 ensures a normal operation of the telescopic rod 300 without being affected by an external environment. Optionally, the sealed connection between the two adjacent rod portions 310 is realized by a sealing ring 350, an O-ring, a gasket or other sealing elements.

Figure 2:
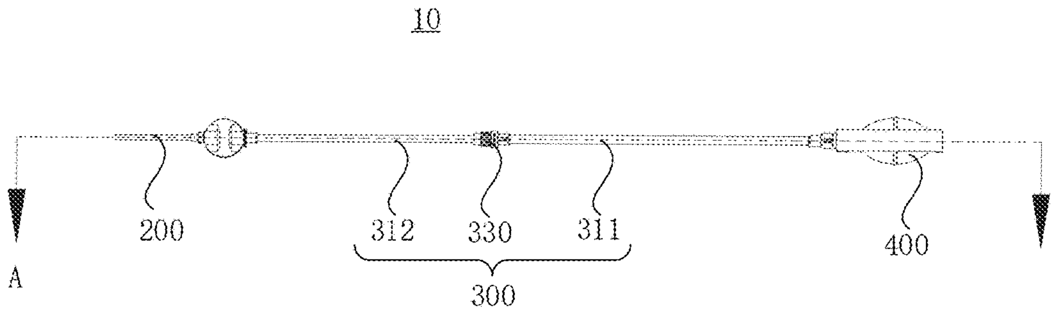
FIG. 2 is another schematic diagram of the powder sprayer according to one embodiment of the present disclosure.
Figure 3:
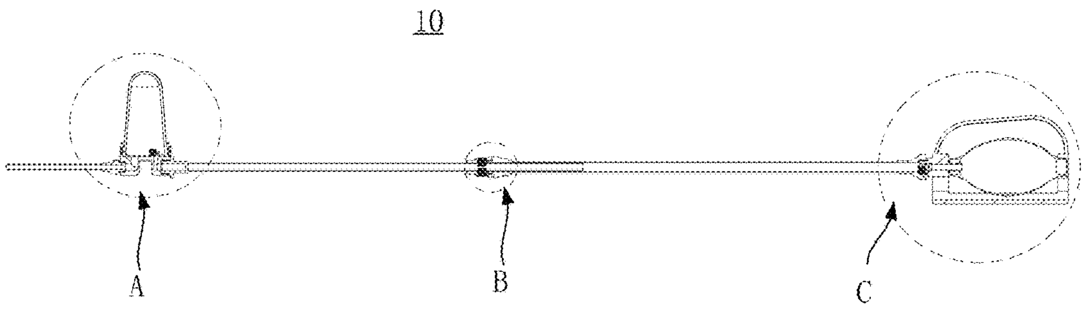
FIG. 3 is a cross-sectional schematic diagram of the powder sprayer taken along a line A-A shown in FIG. 2.
Figure 4:
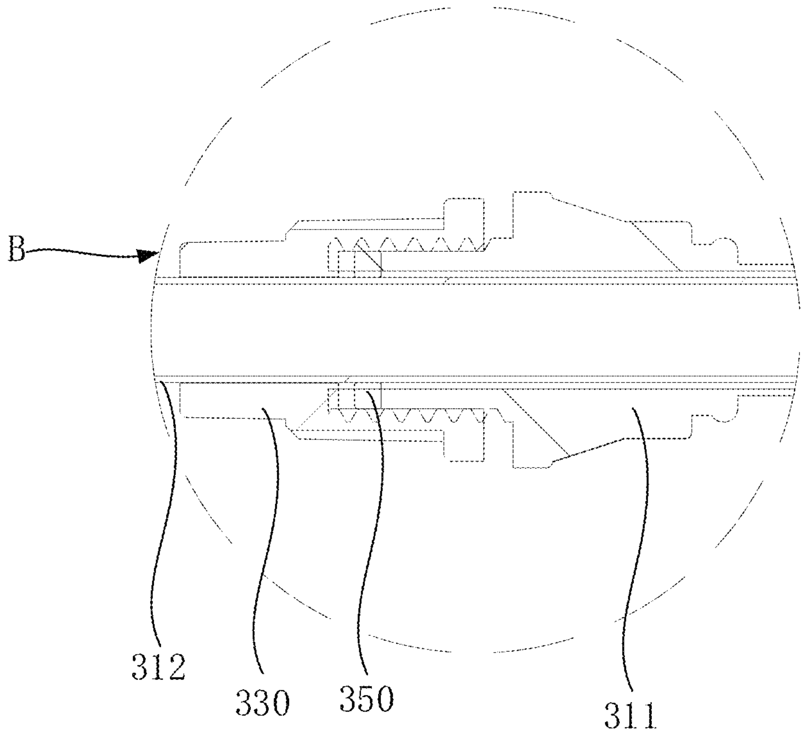
FIG. 4 is an enlarged schematic diagram of portion B of the powder sprayer shown in FIG. 3.

As shown in FIGS. 2-4, FIG. 2 is another schematic diagram of the powder sprayer according to one embodiment of the present disclosure, FIG. 3 is a cross-sectional schematic diagram of the powder sprayer taken along a line A-A shown in FIG. 2, and FIG. 4 is an enlarged schematic diagram of portion B of the powder sprayer shown in FIG. 3. In some embodiments, the rod portions 310 comprise a first rod portion 311 and a second rod portion 312 disposed adjacent to the first rod portion 311. The first rod portion 311 is sleeved on an outer side of the second rod portion 312. The second rod portion 312 is slidable relative to the first rod portion 311. A thread is disposed on an outer periphery of an end portion of the first rod portion 311 close to the second rod portion 312. The telescopic rod 300 further comprises a screw joint 330. The screw joint 330 is sleeved on the second rod portion 312 and is screwed with the thread of the first rod portion 311. The screw joint 330 is configured to fix the second rod portion 312 relative to the first rod portion 311.

In the embodiment, the first rod portion 311 and the second rod portion 312 are two adjacent rod portions 310 in the telescopic rod 300. The first rod portion 311 is sleeved on the outside of the second rod portion 312, and the second rod portion 312 is slidable relative to the first rod portion 311. Whether the length of the telescopic rod 300 needs to be extended or shortened, the operator only needs to apply appropriate force to push or pull the second rod portion 312 to slide in the first rod portion 311, and the length of the telescopic rod 300 is quickly and easily adjusted to adapt to different working scenarios and spraying distances without the need for complicated operating steps or tool assistance.

Moreover, in the embodiment, the thread is disposed on the outer periphery of the end portion of the first rod portion 311 close to the second rod portion 312, and the telescopic rod 300 further comprises the screw joint 330 that is sleeved on the second rod portion 312 and screwed with the thread of the first rod portion 311. After the length of the telescopic rod 300 is adjusted by the operator, the second rod portion 312 and the first rod portion 311 is fixed by rotating the screw joint 330, thereby ensuring that the telescopic rod 300 maintains a stable length during operation, enhancing the stability of a structure of the telescopic rod 300, effectively avoiding a risk of failure caused by relative sliding between the rod portions 310 during operation, and improving working efficiency and reliability of the powder sprayer 10. When the length of the telescopic rod 300 needs to be adjusted again, the operator only needs to rotate the screw connection 330 to unlock it, so there is no need to use complex mechanical devices or additional tools to fix and unlock the telescopic rod 300, thereby improving the operating efficiency.

In some embodiments, the telescopic rod 300 further comprises a sealing ring 350. The sealing ring 350 is sleeved on the second rod portion 312 and disposed between the first rod portion 311 and the second rod portion 312. The screw joint 130 is screwed with the first rod portion 311 and enables the first rod portion 311 and the second rod portion 312 to compress the sealing ring 350.

In the embodiment, the sealing ring 350 is disposed between the first rod portion 311 and the second rod portion 312. The sealing ring 350 effectively fills a gap defined between the first rod portion 311 and the second rod portion 312, thereby preventing the air from leaking out of the telescopic rod 300 and ensuring that the air is able to sufficiently and forcefully push the powder in the powder storage tank 100 to be sprayed out from the nozzle 200. Thus, powder spraying efficiency is improved, and the powder is effectively prevented from leaking out of the telescopic rod 300, which helps to protect the health of operator and reduce an impact on the external environment, so that the operator is able to use the powder sprayer 10 assuredly. In addition, by providing the sealing ring 350, the interior of the telescopic rod 300 is protected from the influence of the external environment, such as dust, moisture, etc., thereby extending the service life of the telescopic rod 300.

In some embodiments, a length of at least one of the rod portions 310 is greater than the length of the nozzle 200. At least one of the rod portions 310 is greater than the length of the nozzle 200, so the nozzle 200 of the powder sprayer 10 is kept at a relatively short length. In the embodiment, it is not necessary to increase the distance between the operator and the sprayed powder by increasing the length of the nozzle 200. Instead, the rod portions 310 that are relatively long are provided, so that the operator is able to control the powder sprayer 10 to accurately spray powder at a farther distance, effectively increasing a physical distance between the operator and the target spraying are, and increasing the safety of the operation. In addition, the operator is allowed to stand in a relatively fixed position, and by adjusting a placing angle of the powder sprayer 10 and an extension direction of the rod portions 310, it is easier to complete a large-area powder spraying operation without frequently movement, making the operation convenient and efficient.

Figure 5:
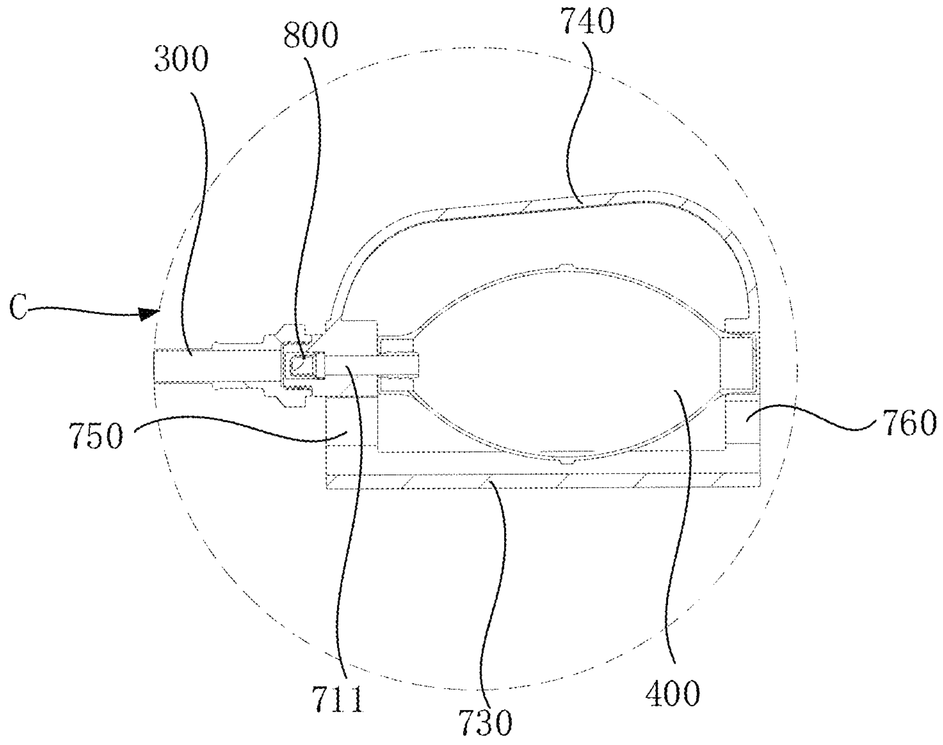
FIG. 5 is an enlarged schematic diagram of portion C of the powder sprayer shown in FIG. 3.

As shown in FIG. 5, FIG. 5 is an enlarged schematic diagram of portion C of the powder sprayer shown in FIG. 3. In some embodiments, the powder sprayer further comprises a handle 700. The handle 700 is connected to the one end of the telescopic rod 300 away from the powder storage tank 100, and the balloon 400 is mounted on the handle 700. Configuration of the handle 700 allows the operator to hold the powder sprayer 10 comfortably. A design of the handle 700 takes into account both ergonomics and practicality, so the operator is allowed to complete the powder spraying operation in a relaxed and natural way. The balloon 400 is mounted on the handle 700, so that the operator is enable to naturally touch the balloon 400 when holding the handle 700, and the spraying of the powder is easily controlled.

In some embodiments, the handle 700 comprises a first end portion 750 and a second end portion 760 disposed opposite to the first portion. The balloon 400 is mounted between the first end portion 750 and the second end portion 760 of the handle 700. The first end portion 750 of the handle 700 is connected to the telescopic rod 300. The balloon 400 is mounted between the first end portion 750 and the second end portion 760 of the handle 700, so the balloon 400 and the handle 700 form a compact whole, which provides stable support, reduces shaking of the balloon 400 during use, and improves accuracy of spraying powder. The first end portion 750 is directly connected to the telescopic rod 300, which ensures that the force applied by the operator to the balloon 400 is directly and effectively transmitted to the telescopic rod 300, thereby improving the powder spraying efficiency of the powder sprayer 10.

In some embodiments, the first end portion 750 of the handle 700 defines an air channel 711, and the balloon 400 is communicated with the telescopic rod 300 through the air channel 711. The air channel 711 serves as a medium connecting the balloon 400 and the telescopic rod 300, ensuring that the air input by squeezing the balloon 400 is smoothly transmitted to the interior of the telescopic rod 300, reducing air leakage during the transmission process, ensuring that more air is transmitted to spray the powder, and improving performance of the powder sprayer 10.

In some embodiments, the powder sprayer further comprises a check valve 800, and the check valve 800 is disposed in the air channel 711. The check valve 800 is disposed in the air channel 711, so the check valve 800 is well protected from interference and damage from the external environment, while ensuring one-way flow of the air. Therefore, the powder in the powder storage tank 100 is prevented from being brought back into the telescopic rod 300 or the balloon 400 by the air during the spraying process.

In some embodiments, the handle 700 further comprises a first connecting portion 730. The first connecting portion 730 connects the first end portion 750 of the handle 700 to the second end portion 760 of the handle 700. One side of the first connecting portion 730 facing the balloon 400 is arc-shaped and is matched with the balloon 400. The first connecting portion 730 connects the first end portion 750 of the handle 700 to the second end portion 760 of the handle 700, and the one side of the first connecting portion 730 facing the balloon 400 is arc-shaped and is matched with the balloon 400. An arc-shaped design of the one side of the first connecting portion 730 enables the first connecting portion 730 to better fit a shape of the balloon 400, thereby optimizing a spatial layout between the handle 700 and the balloon 400.

A shape of the first connection part 730 is an arc shape that matches the balloon 400. Therefore, the operator can easily hold the first connection part 730 with one hand and naturally apply pressure to the balloon 400 with four fingers. When the fingers squeeze the balloon 400, the air inside the balloon 400 is pushed and quickly blown into the powder storage tank 100 through the telescopic rod 300 connected thereto. In the process, the powder in the powder storage tank 100 is driven by the strong airflow and sprayed out from the nozzle 200, realizing an efficient powder spraying function.

In some embodiments, the handle 700 further comprises a second connecting portion 740 disposed opposite to the first connecting portion 730. The second connecting portion 740 is connected between the first end portion 750 of the handle 700 and the second end portion 760 of the handle 700. The second connecting portion 740 is spaced apart from the balloon 400. The second connecting portion 740 is also connected between the first end portion 750 of the handle 700 and the second end portion 760 of the handle 700. The second connection portion 740 and the first connection portion 730 form a ring structure. The ring structure surrounds the balloon 400 in a middle portion thereof, so the balloon 400 is better protected and a risk of damage to the balloon 400 due to accidental collision or squeezing during use is reduced. A certain distance is defined between the second connection portion 740 and the balloon 400 to ensure that the second connection portion 740 does not affect a squeezing operation of the operator on the balloon 400.

By configurations of the first connecting portion 730 and the second connecting portion 740, an overall structure of the handle 700 is made stable, which not only improves the reliability of the powder sprayer 10 during operation, but also enables the handle 700 to adapt to hand shapes and holding habits of different operators. The operator is able to choose different holding positions on the ring structure according to his/her preference and work requirements, thereby obtaining a comfortable holding experience.

Figure 6:
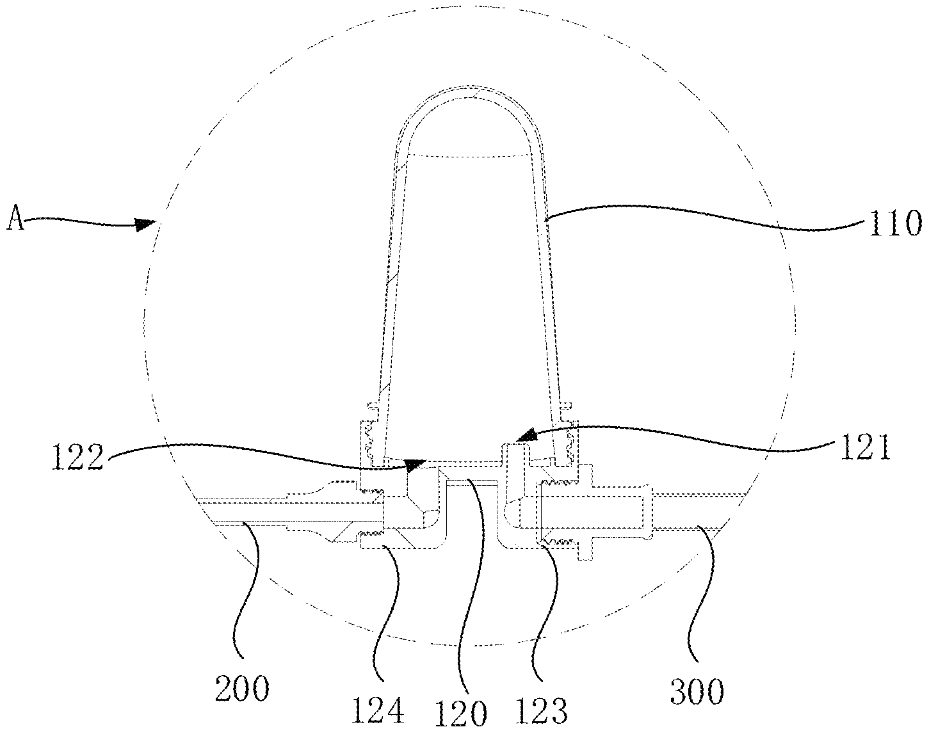
FIG. 6 is an enlarged schematic diagram of portion A of the powder sprayer shown in FIG. 3.

As shown in FIG. 6, FIG. 6 is an enlarged schematic diagram of portion A of the powder sprayer shown in FIG. 3. In some embodiments, the powder storage tank 100 comprises a tank body 110 and a cover body 120. The cover body 120 covers the tank body 110. The cover body 120 comprises an air inlet 121 and an air outlet 122. The air inlet 121 is communicated with the telescopic rod 300. The air outlet 122 is communicated with the nozzle 200.

In the embodiment, the tank body 110 of the powder storage tank 100 is configured to store the powder, and the cover body 120 is integrated with the air inlet 121 and the air outlet 122. The air inlet 121 is communicated with the telescopic rod 300, and the air outlet 122 is communicated with the nozzle 200, which ensures that the air is able to smoothly slowing into and flowing out of the powder storage tank 100 and then effectively drive the powder to be sprayed through the nozzle 200. The air inlet 121 and the air outlet 122 are defined in the cover body 120 of the powder storage tank 100 instead of the tank body 110, so that when the air is in a static state, the powder is not accumulated in the air inlet 121 and the air outlet 122, which effectively avoids a clogging problem caused by powder accumulation and ensures smooth flow of the air in the air inlet 121 and the air outlet 122. Therefore, in the powder spraying operation, the air quickly and smoothly enters the tank body 110 through the air inlet 121 and drives the powder to be efficiently sprayed out from the air outlet 122. In addition, the air inlet 121 and the air outlet 122 are defined in the cover body 120, so that connections between the powder storage tank 100, the telescopic rod 300, and the nozzle 200 are flexible and convenient. When it is necessary to replace or add the powder, it is only necessary to open the cover body 120 to easily move the tank body 110 for operation, which brings a convenient and efficient use experience to the operator.

In some embodiments, the powder storage tank 100 further comprises an air inlet pipe 123 and an air outlet pipe 124. The air inlet pipe 123 is communicated with the air inlet 121. The air outlet pipe 124 is communicated with the air outlet 122. The telescopic rod 300, the powder storage tank 100, and the nozzle 200 are disposed in sequence. The air inlet pipe 123 is bent in a direction away from the tank body 110 and towards the telescopic rod 300. The air outlet pipe 124 is bent in the direction away from the tank body 110 and towards the nozzle 200.

In the embodiment, the air inlet pipe 123 that is bent directly and efficiently guides the air input by squeezing the balloon 400 from the telescopic rod 300 to the tank body 110. The air mixed with the powder in the tank body 110 is guided from the air outlet pipe 124 that is bent to the nozzle 200, thereby enhancing a guiding effect of the air. Thus, the air is allowed to flow smoothly along a predetermined path, so as to reduce air flow turbulence and energy loss, and improve the powder conveying efficiency and spraying quality.

In some embodiments, the air inlet pipe 123 protrudes from one side of the cover body 120 toward the tank body 110. The air inlet pipe 123 protrudes from the cover body 120 and towards the tank body 110, that is, the air inlet pipe 123 is inserted into the tank body 110, and the air inlet pipe 123 is close to or deep into a powder storage area, and the air from the air inlet pipe 123 directly acts on more powder. When the air enters through the air inlet pipe 123, it is fully mixed with the powder, and the powder is smoothly carried by the air and is transferred to the nozzle 200. Further, the air is able to blow the powder in the tank body 110 during a flow process, so the accumulation of the powder on walls or corners of the tank body 110 is reduced, thereby reducing powder residue and improving powder discharge efficiency and a powder utilization rate.

In some embodiments, the telescopic rod 300 is screwed with the air inlet pipe 123, and the nozzle 200 is screwed with the air outlet pipe 124. The telescopic rod 300 and the air inlet pipe 123, as well as the nozzle 200 and the air outlet pipe 124, are connected by screw connection. During the operation of the powder sprayer 10, the screw connection thereof withstands greater pressure and vibration, ensuring that the telescopic rod 300, the air inlet pipe 123, the nozzle 200, and the air outlet pipe 124 are tightly and stably connected, and are not prone to loosening or falling off. Moreover, the screw connection is convenient for disassembly. When one of components needs to be repaired, cleaned, or replaced, the one of the components is easily separated by simply rotating the one of the component in an opposite direction, thereby reducing maintenance costs. In addition, as a common mechanical connection method, the screw connection is easy and quick to operate, does not require complex tools or skills, and improves mounting efficiency.

Since the telescopic rod 300 is screwed with the air inlet pipe 123, the telescopic rod 300 is rotatable relative to the powder storage tank 100. The operator is able to adjust a direction of the telescopic rod 300 relative to the powder storage tank 100 as needed. By changing the direction of the telescopic rod 300, an airflow direction of the air in the air inlet 121 is indirectly adjusted, thereby changing a direct direction of the airflow on the powder. A driving force of the airflow on the powder may change as the direction of the airflow changes, thereby affecting a flow rate and a powder output of the powder. Different spraying operations may require different powder outputs. By adjusting the direction of the telescopic rod 300, the operator is able to accurately control the powder output to meet different spraying requirements, thereby enhancing the user experience.

In some embodiments, the air inlet pipe 123, the air outlet pipe 124, and the cover body 120 are integrally formed. The air inlet pipe 123, the air outlet pipe 124 and the cover body 120 are designed to be integrally formed. The air inlet pipe 123, the air outlet pipe 124, and the cover body 120 are integrated into an integral component during the manufacturing process, which reduces the number of structural parts. There is no need for subsequent assembly steps between the air inlet pipe 123, the air outlet pipe 124 and the cover body 120, which reduces a difficulty of operation during assembly, debugging and use for the operator and improves the overall convenience of use. In addition, an integrally formed design thereof enhances a connection strength between the air inlet pipe 123, the air outlet pipe 124, and the cover body 120, reduces a risk of failure caused by loose or falling parts, and improves structural stability and reliability. Of course, in some other embodiments, the air inlet pipe 123, the air outlet pipe 124, and the cover body 120 are separated components.

Optionally, the handle 700 and the telescopic rod 300 are made of a lightweight and hard material, which helps to reduce a weight of the powder sprayer 10 and make the powder sprayer 10 easy to operate. The handle 700 and the telescopic rod 300 are hard, so the handle 700 and the telescopic rod 300 are durable and are able to withstand pressure and wear in daily operation, thereby making the overall structure of the powder sprayer 10 stable. The operator is allowed to easily spray the powder on the target spraying area even with one hand. Whether it is in a narrow space or needs to spray powder at a high place, the powder sprayer can easily cope with it. In addition, in the embodiment, the telescopic rod 300 and the handle 700 are hard, which is also an important factor in the powder sprayer 10 being able to achieve one-handed operation. If the telescopic rod 300 and the handle 700 are not hard, and the balloon 400 is soft, the handle 700 is unable to provide enough structural support for the balloon 400, and the telescopic rod 300 is unable to bear a weight of the powder storage tank 100 and the nozzle 200. As a result, the operator must hold the balloon 400 in one hand to operate, and hold the powder storage tank 100 in the other hand, which causes inconvenience in operation. In contrast, since the telescopic rod 300 and the handle 700 are hard, the overall structure of the powder sprayer 10 is stable and reliable. The telescopic rod 300 that is hard is able to transmit the force applied by the operator to ensure that the powder is sprayed evenly and powerfully. The handle 700 that is hard provides a good grip feel and stability, so that the operator is able to easily control the powder sprayer 10 with one hand to point to the target spraying area that needs to be sprayed. Therefore, the configurations of the telescopic rod 300 and the handle 700 that are hard in the embodiment improve the convenience and flexibility of operation of the powder sprayer 10.

Figure 7:
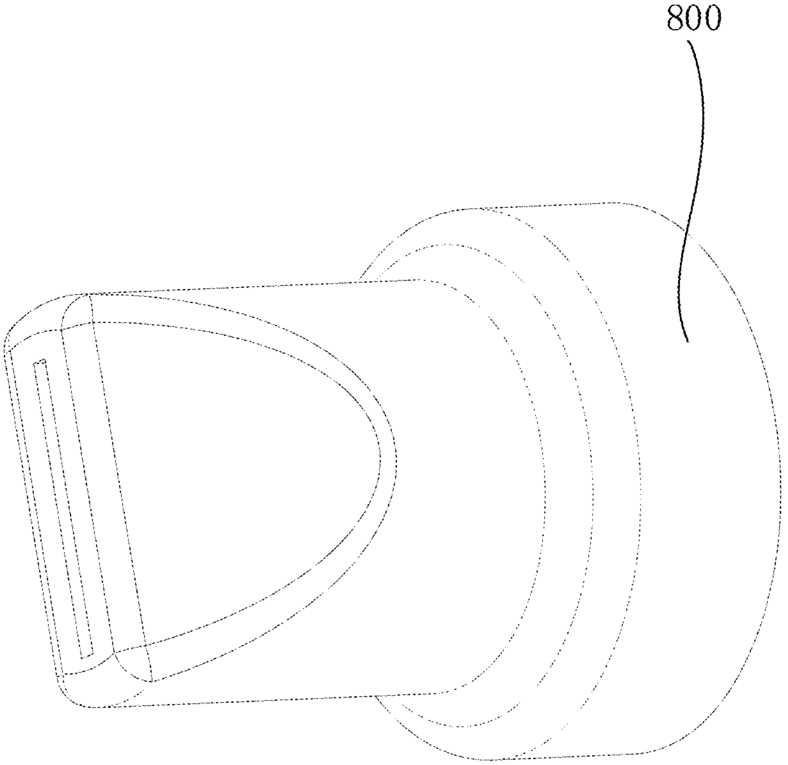
FIG. 7 is a schematic diagram of a check valve of the powder sprayer shown in FIG. 4.

As shown in FIG. 7, FIG. 7 is a schematic diagram of the check valve of the powder sprayer shown in FIG. 4. In the embodiments, the powder sprayer further comprises a check valve 800. The check valve 800 is configured to control one-way flow of the air, ensure that the air flows smoothly on a specific path, and prevent the air from flowing back. Optionally, one or more check valves 800 are provided. When check valves are provided, the check valves 800 are flexibly disposed at a plurality of positions to ensure a stable operation of the powder sprayer 10, protect the safety of the operator, and improve the powder spraying effect.

In some embodiment, when only one check valve 800 is provided, the check valve 800 is disposed between the balloon 400 and the telescopic rod 300. When the operator squeezes the balloon 400, the air in the balloon 400 is pushed and flows to the telescopic rod 300 through the check valve 800, then the air pushes the powder in the powder storage tank 100 to be sprayed out. After the operator releases the balloon 400, the balloon 400 restores to an original shape and form a negative pressure area in a restore process. The check valve 800 effectively prevents the air in the telescope rod 300 from flowing back to the balloon 400. If there is no check valve 800, the air in the powder storage tank 100 may flow back to the telescopic rod 300 and the balloon 400 under an action of negative pressure, which reduces the powder spraying effect. More importantly, back flowing air is mixed with the powder, which increases the risk of the powder being physically in contact with the operator. In the embodiment, by providing the check valve 800, when squeezing the balloon 400, the air is allowed to flow out smoothly; and when the balloon 400 restores the original shape, the air is prevented from flowing back, thereby avoiding the risk of the air and the powder in the powder storage tank 100 being inhaled. Therefore, the performance of the powder sprayer 10 is improved and the health and safety of the operator are ensured. For example, the balloon 400 restores the original shape after being released, and fresh air is sucked from one end of the balloon 400 away from the powder storage tank 100, rather than sucking the air and the powder in the powder storage tank 100.

In some embodiments, the powder sprayer 10 comprises only one check valve 800. The check valve 800 is disposed between the telescopic rod 300 and the powder storage tank 100, which ensures that the air is only allowed to flow from the telescopic rod 300 to the powder storage tank 100, but is unable to flow back from the powder storage tank 100 to the telescopic rod 300, thereby ensuring that the powder in the powder storage tank 100 is not brought back to the telescopic rod 300 or the balloon 400 by the air during the spraying process, ensuring the health and safety of the operator, and helping to maintain the stability and reliability of the powder sprayer 10.

In some alternative embodiments, the powder sprayer 10 comprises only one check valve 800. The check valve is disposed in the telescopic rod 300. The check valve 800 is disposed inside, so the check valve 800 is prevented from interference and damage from the external environment. Further, the check valve 800 also ensures the one-way flow of the air and prevents the powder in the powder storage tank 100 from being brought back into the telescopic rod 300 or the balloon 400 by the air during the spraying process.

The most suitable configuration method of the one or more check valves 800 is selected according to specific application scenario and requirements. There may be one check valve, or the check valves 800 are respectively disposed between the telescopic rod 300 and the powder storage tank 100, inside the telescopic rod 300, and between the telescopic rod 300 and the balloon 400, which is not limited thereto.

In the foregoing embodiments, the description of each of the embodiments has its own emphasis, and some features that are not detailed or described in some of the embodiments may refer to related descriptions of other embodiments. The embodiments, implementations and related technical features of the present disclosure can be combined and replaced with each other without conflict.

The above embodiments of the present disclosure provide a detailed illustration to the powder sprayer. In the present disclosure, specific embodiments are applied to illustrate the principles and implementations of the present disclosure. The above description of the embodiments is only used to better understand methods and core ideas of the present disclosure. Meanwhile, according to the ideas of the present disclosure, changes are made in the specific implementations and the application scope by those skilled in the art. Therefore, the contents of the specification should not be regarded as a limitation of the present disclosure.

What is claimed is:

1. A powder sprayer, comprising:
a powder storage tank;
a nozzle communicated with the powder storage tank;
a telescopic rod; and
a balloon;
wherein the telescopic rod is communicated with the powder storage tank and is spaced apart from the nozzle, a length of the telescopic rod is adjustable, and the balloon is communicated with one end of the telescopic rod away from the powder storage tank;
wherein the powder sprayer further comprises a handle, the handle is connected to the one end of the telescopic rod away from the powder storage tank, and the balloon is mounted on the handle;
wherein the handle comprises a first end portion and a second end portion disposed opposite to the first portion, the balloon is mounted between the first end portion and the second end portion of the handle, and the first end portion of the handle is connected to the telescopic rod;
wherein the handle further comprises a first connecting portion, the first connecting portion connects the first end portion of the handle to the second end portion of the handle, and wherein one side of the first connecting portion facing the balloon is arc-shaped and is matched with the balloon;
wherein the handle further comprises a second connecting portion disposed opposite to the first connecting portion, the second connecting portion is connected between the first end portion of the handle and the second end portion of the handle, and the second connecting portion is spaced apart from the balloon, wherein the second connection portion and the first connection portion form a closed ring structure that surrounds the balloon in a middle region thereof.

2. The powder sprayer according to claim 1, wherein the telescopic rod comprises a plurality of rod portions, the plurality of rod portions are sequentially connected between the balloon and the powder storage tank, the plurality of rod portions are communicated with each other, and wherein every two adjacent rod portions are sleeved with each other and are slidable relative to each other.

3. The powder sprayer according to claim 2, wherein the two adjacent rod portions are hermetically connected.

4. The powder sprayer according to claim 3, wherein the rod portions comprise a first rod portion and a second rod portion disposed adjacent to the first rod portion, the first rod portion is sleeved on an outer side of the second rod portion, the second rod portion is slidable relative to the first rod portion, and a thread is disposed on an outer periphery of an end portion of the first rod portion close to the second rod portion;

wherein the telescopic rod further comprises a screw joint, the screw joint is sleeved on the second rod portion and is screwed with the thread of the first rod portion, and the screw joint is configured to fix the second rod portion relative to the first rod portion.

5. The powder sprayer according to claim 4, wherein the telescopic rod further comprises a sealing ring, and the sealing ring is sleeved on the second rod portion and disposed between the first rod portion and the second rod portion.

6. The powder sprayer according to claim 2, wherein a length of at least one of the rod portions is greater than a length of the nozzle.

7. The powder sprayer according to claim 1, wherein the first end portion of the handle defines an air channel, and the balloon is communicated with the telescopic rod through the air channel.

8. The powder sprayer according to claim 7, wherein the powder sprayer further comprises a check valve, and the check valve is disposed in the air channel.

9. The powder sprayer according to claim 1, wherein the powder storage tank comprises a tank body and a cover body, the cover body covers the tank body, the cover body comprises an air inlet and an air outlet, the air inlet is communicated with the telescopic rod, and the air outlet is communicated with the nozzle.

10. The powder sprayer according to claim 9, wherein the powder storage tank further comprises an air inlet pipe and an air outlet pipe, the air inlet pipe is communicated with the air inlet, and the air outlet pipe is communicated with the air outlet;

wherein the telescopic rod, the powder storage tank, and the nozzle are disposed in sequence, the air inlet pipe is bent in a direction away from the tank body and towards the telescopic rod, and the air outlet pipe is bent in the direction away from the tank body and towards the nozzle.

11. The powder sprayer according to claim 10, wherein the air inlet pipe protrudes from one side of the cover body toward the tank body.

12. The powder sprayer according to claim 10, wherein the telescopic rod is screwed with the air inlet pipe, and the nozzle is screwed with the air outlet pipe.

13. The powder sprayer according to claim 12, wherein the air inlet pipe, the air outlet pipe, and the cover body are integrally formed.

14. The powder sprayer according to claim 1, wherein the powder sprayer further comprises a check valve, and the check valve is disposed between the balloon and the telescopic rod.

15. The powder sprayer according to claim 1, wherein the powder sprayer further comprises a check valve, and the check valve is disposed between the telescopic rod and the powder storage tank.

* * * * *